(12) United States Patent
Itoh

(10) Patent No.: US 7,620,308 B2
(45) Date of Patent: Nov. 17, 2009

(54) DIGITAL CAMERA AND METHOD OF CONTROLLING THE SAME

(75) Inventor: Daisuke Itoh, Asaka (JP)

(73) Assignee: Fujifilm Corporation, Tokyo (JP)

( * ) Notice: Subject to any disclaimer, the term of this patent is extended or adjusted under 35 U.S.C. 154(b) by 311 days.

(21) Appl. No.: 11/634,900

(22) Filed: Dec. 7, 2006

(65) Prior Publication Data

US 2007/0133971 A1    Jun. 14, 2007

(30) Foreign Application Priority Data

Dec. 9, 2005    (JP) .............................. 2005-355624

(51) Int. Cl.
*G03B 13/18* (2006.01)
*G03B 15/03* (2006.01)

(52) U.S. Cl. .................. 396/106; 396/127; 396/108; 348/371; 348/349; 348/353; 348/356

(58) Field of Classification Search ................ 396/125, 396/127, 89, 96, 102, 106, 124, 157, 165, 396/121–123, 104, 133–136; 348/370, 345, 348/349, 353–356

See application file for complete search history.

(56) References Cited

U.S. PATENT DOCUMENTS 6,028,981 A * 2/2000 Hirasawa et al. ............. 386/117
6,236,431 B1 * 5/2001 Hirasawa et al. ....... 348/240.99
7,388,614 B2 * 6/2008 Yasuda ........................ 348/349
2003/0048372 A1 * 3/2003 Yasuda ........................ 348/349
2003/0160886 A1 * 8/2003 Misawa et al. .............. 348/347
2004/0095504 A1 * 5/2004 Yasuda ........................ 348/345
2006/0152617 A1 * 7/2006 Konishi ....................... 348/345

FOREIGN PATENT DOCUMENTS

JP    6-225198 A    8/1994
JP    2001-257931 A    9/2001

* cited by examiner

*Primary Examiner*—Melissa J Koval
*Assistant Examiner*—Bret Adams
(74) *Attorney, Agent, or Firm*—Birch, Stewart, Kolasch & Birch, LLP

(57) ABSTRACT

In order to carry out relatively accurate AF control while eliminating the adverse effect on a reproduced moving picture, a subject is imaged every $\frac{1}{30}$ seconds, so that subject images are obtained. Image data representing the subject images respectively corresponding to odd-numbered frames are recorded on a memory card as image data representing the moving picture. At timing where the subject images respectively corresponding to even-numbered frames are obtained by the imaging, auxiliary light is irradiated onto the subject. A high-frequency component is extracted from the image data representing each of the subject images respectively corresponding to even-numbered frames, so that focusing data representing the degree of focusing of the subject image is obtained. Since the subject image used for focusing control is bright, focusing control can be carried out relatively accurately. The image data to be recorded is not affected by the auxiliary light, so that the reproduced moving picture is also avoided being affected by the auxiliary light.

8 Claims, 15 Drawing Sheets

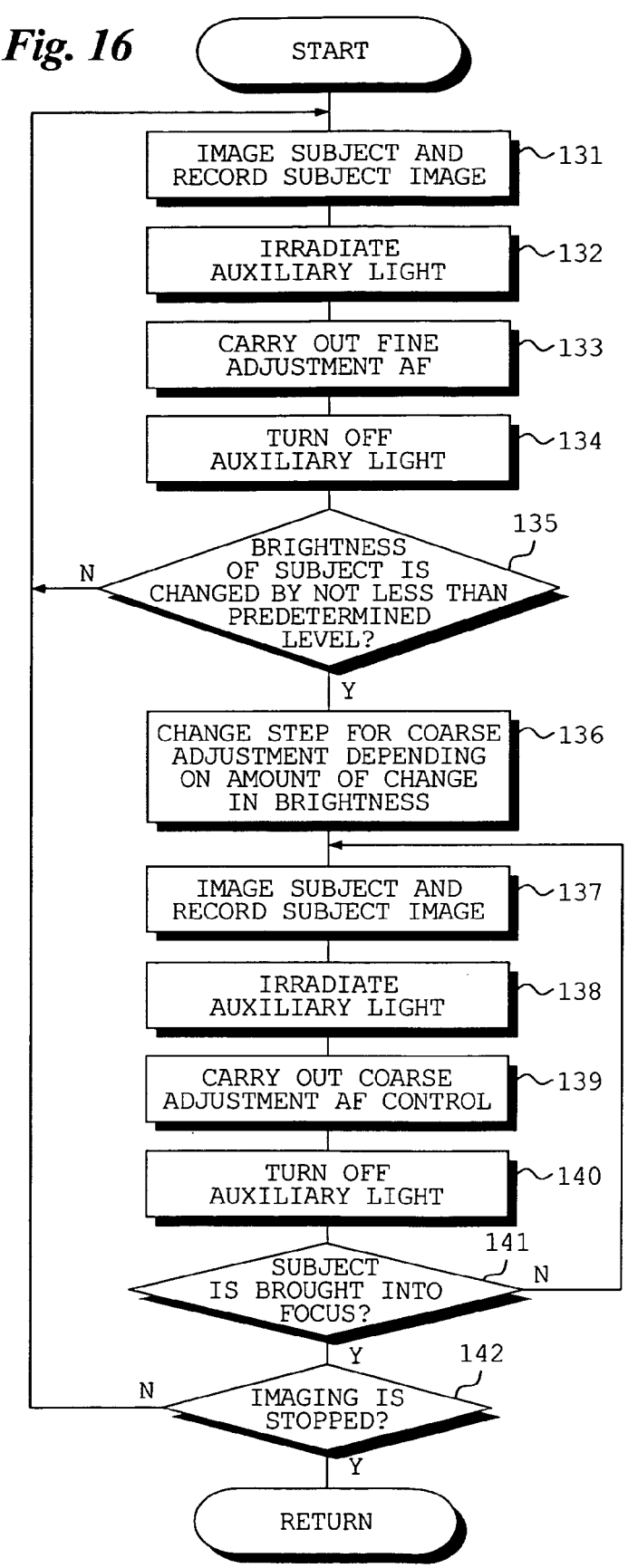

DIGITAL CAMERA AND METHOD OF CONTROLLING THE SAME

BACKGROUND OF THE INVENTION

1. Field of the Invention

The present invention relates to a digital camera and a method of controlling the same.

2. Description of the Background Art

In a case where a moving picture is imaged, it is preferable that a subject is accurately brought into focus, so that an imaging period may, in some cases, be delayed when the brightness of the subject is insufficient (see JP-A-2001-257931). Further, a stable focusing operation may, in some cases, be performed even if a zoom position is changed (see JP-A-6-225198).

Even if the focusing operation becomes accurate, however, image data to be recorded may, in some cases, be adversely affected.

SUMMARY OF THE INVENTION

An object of the present invention is to accurately perform a focusing operation without adversely affecting image data to be recorded.

A digital camera according to a first invention is characterized by comprising a solid-state electronic imaging device that continuously images a subject in a predetermined period and outputs image data representing a subject image in the predetermined period; an imaging lens arranged so as to be movable ahead of a light receiving surface of the solid-state electronic imaging device; an auxiliary light emission control device that controls an auxiliary light emitting device such that auxiliary light is irradiated onto the subject at a rate of once per a plurality of times of imaging in the solid-state electronic imaging device; an imaging lens positioning device that images the subject onto which the auxiliary light has been irradiated under the control of the auxiliary light emission control device, to position the imaging lens at a focusing position on the basis of the image data outputted from the solid-state electronic imaging device; and a recording control device that images the subject when the auxiliary light is not irradiated by the auxiliary light emission control device, to record on a recording medium the image data outputted from the solid-state electronic imaging device.

The first invention also provides a controlling method suitable for the digital camera. That is, in a digital camera comprising a solid-state electronic imaging device that continuously images a subject in a predetermined period and outputs image data representing a subject image in the predetermined period, and an imaging lens arranged so as to be movable ahead of a light receiving surface of the solid-state electronic imaging device, the method comprises the steps of irradiating auxiliary light onto the subject at a rate of once per a plurality of times of imaging in the solid-state electronic imaging device; imaging the subject onto which the auxiliary light has been irradiated, to position the imaging lens at a focusing position on the basis of the image data outputted from the solid-state electronic imaging device; and imaging the subject when the auxiliary light is not irradiated, to record on a recording medium the image data outputted from the solid-state electronic imaging device.

According to the first invention, the subject is imaged in the predetermined period, and the image data representing the subject image is obtained. The auxiliary light is irradiated onto the subject at a rate of once per a plurality of times of imaging. The imaging lens is positioned at the focusing position on the basis of the image data representing the subject image obtained by the imaging when the auxiliary light is irradiated. The image data representing the subject image obtained by the imaging when the auxiliary light is not irradiated is recorded on the recording medium. Since the imaging lens is positioned at the focusing position on the basis of the image data representing the subject image obtained by irradiating the auxiliary light, the imaging lens can be positioned relatively accurately. Since the auxiliary light is not irradiated onto the image data recorded on the recording medium, the effect of the auxiliary light on the image data is eliminated.

The imaging lens positioning device may image the subject onto which the auxiliary light has been irradiated under the control of the auxiliary light emission control device, to position the imaging lens at the focusing position on the basis of a part of the image data outputted from the solid-state electronic imaging device. Since the imaging lens is positioned at the focusing position on the basis of a part of the image data whose data amount is smaller than the data amount of image data corresponding to one frame, the positioning processing can be terminated relatively quickly.

The positioning in the imaging lens positioning device may be positioning for finely adjusting the position of the imaging lens. In this case, it is preferable that the digital camera further comprises a brightness determination device that determines whether or not the brightness of the subject is changed by not less than the predetermined level, and an imaging lens positioning control device that switches the positioning in the imaging lens positioning device into positioning by coarse adjustment in response to the determination by the brightness determination device that the brightness of the subject is changed by not less than the predetermined level, and returns the coarse adjustment to the fine adjustment in response to the positioning of the imaging lens at the focusing position by the coarse adjustment. The imaging lens can be quickly positioned.

The brightness determination device may also determine whether the brightness of the subject is so changed as to increase or decrease by not less than the predetermined level. In this case, the imaging lens positioning control device will switch the positioning in the imaging lens positioning device into positioning for coarsely adjusting the position on the NEAR side in response to the determination by the brightness determination device that the brightness of the subject is so changed as to increase by not less than the predetermined level, switch the positioning in the imaging lens positioning device into positioning for coarsely adjusting the position on the FAR side in response to the determination by the brightness determination device that the brightness of the subject is so changed as to decrease by not less than the predetermined level, and return the coarse adjustment to the fine adjustment in response to the positioning of the imaging lens at the focusing position by the coarse adjustment. The side on which the positioning of the imaging lens is started can be determined depending on the amount of change in the brightness, so that the positioning can be quickly terminated.

The brightness determination device may also detect the amount of change in the brightness by not less than the predetermined level. In this case, the imaging lens positioning control device will decrease the step of adjusting the positioning by the coarse adjustment when the brightness is at not less than the predetermined level and the amount of change in the brightness is small, while increasing the step of adjusting the positioning by the coarse adjustment when the brightness is at not less than the predetermined level and the amount of change in the brightness is large. Since the step of adjusting the positioning by the coarse adjustment can be changed depending on the amount of change in the brightness, the adjustment of the positioning can be quickly terminated.

A digital camera according to a second invention comprises a solid-state electronic imaging device that continuously images a subject in a predetermined period and outputs image data representing a subject image in the predetermined period; an imaging lens arranged so as to be movable ahead of a light receiving surface of the solid-state electronic imaging device; a first imaging lens positioning device that positions the imaging lens at a focusing position on the basis of the image data outputted from the solid-state electronic imaging device at a rate of once per a plurality of times of imaging in the solid-state electronic imaging device; and a recording control device that images the subject when the imaging lens is not positioned by the imaging lens positioning device, to record on a recording medium the image data outputted from the solid-state electronic imaging device.

The second invention also provides a control method suitable for the digital camera. That is, in a digital camera comprising a solid-state electronic imaging device that continuously images a subject in a predetermined period and outputs image data representing a subject image in the predetermined period, and an imaging lens arranged so as to be movable ahead of a light receiving surface of the solid-state electronic imaging deice, the method comprises the steps of positioning the imaging lens at a focusing position on the basis of the image data outputted from the solid-state electronic imaging device at a rate of once per a plurality of times of imaging in the solid-state electronic imaging device; and imaging the subject when the imaging lens is not positioned, to record on a recording medium the image data outputted from the solid-state electronic imaging device.

According to the second invention, the subject is imaged in the predetermined period, and the image data representing the subject image is obtained. The imaging lens is positioned at the focusing position on the basis of the image data obtained at the rate of once per the plurality of times of imaging. The image data obtained by imaging the subject when the imaging lens is not positioned (when the imaging lens is not moved) is recorded on the recording medium. Since the image data obtained when the imaging lens is moved so as to be positioned at the focusing position is not recorded on the recording medium, the adverse effect at the time of the movement of the imaging lens can be eliminated from the image data recorded on the recording medium.

The first imaging lens positioning device may finely adjust the imaging lens to position the imaging lens at the focusing position. In this case, the digital camera will further comprise a second imaging lens positioning device that coarsely adjusts the imaging lens to position the imaging lens at the focusing position when the positioning of the imaging lens is not finely adjusted by the first imaging lens positioning device.

The digital camera may further comprise an auxiliary light emission control device that controls an auxiliary light emitting device such that auxiliary light is irradiated onto the subject at the time of imaging at a rate of once per a plurality of times of imaging, which corresponds to the time of positioning the imaging lens in the first imaging lens positioning device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9 to 16 are flow charts showing the procedure for processing in a moving picture imaging mode.

DESCRIPTION OF THE PREFERRED EMBODIMENTS

Figure 1A:
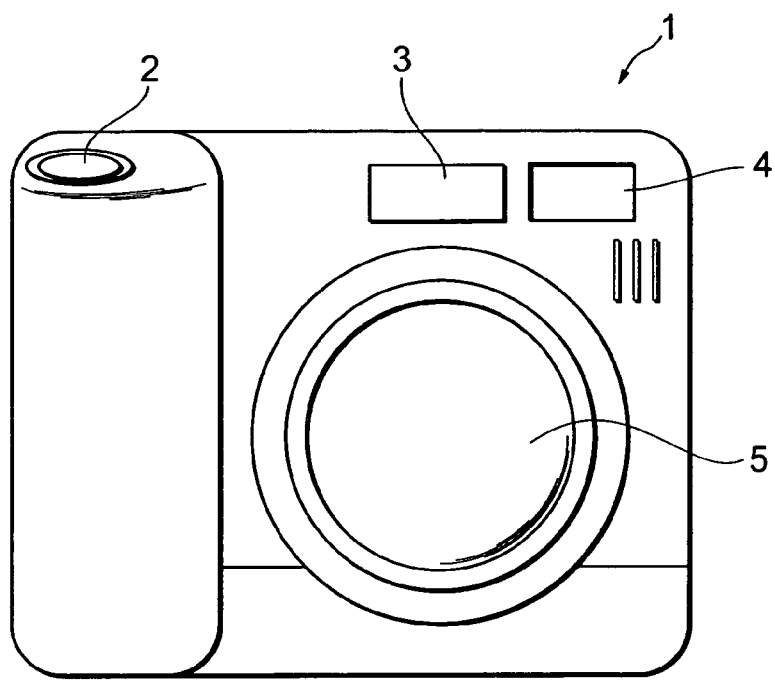
FIG. 1A is a front view of a digital still camera.
Figure 1B:
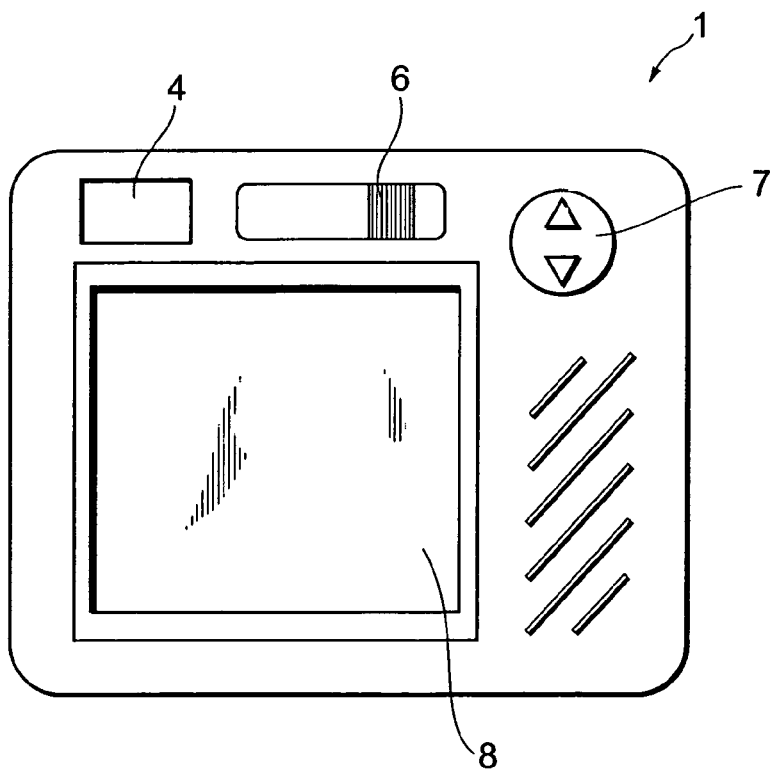
FIG. 1B is a rear view of the digital still camera.

FIGS. 1A and 1B illustrate the appearance of a digital still camera, showing an embodiment of the present invention, where FIG. 1A is a front view of the digital still camera, and FIG. 1B is a rear view of the digital still camera.

Referring to FIG. 1A, a shutter release switch 2 of a two-stage stroke type is provided at the upper left of a front surface of a digital still camera 1. A lens 5 is exposed to a substantially central part of the digital still camera 1. An auxiliary light emitting device 3 for irradiating auxiliary light onto a subject, as described later, is provided above the lens 5. An optical view finder 4 is provided along the right side of the auxiliary light emitting device 3.

Referring to FIG. 1B, a liquid crystal display screen 8 is provided over substantially the whole of a rear surface of the digital still camera 1. The optical view finder 4 exists, as described above, above the left side of the liquid crystal display screen 8. An imaging mode switch 6 is provided above the liquid crystal display screen 8. A zoom switch 7 is provided above the right side of the liquid crystal display screen 8.

In the digital still camera 1 according to the present embodiment, a still picture imaging mode or a moving picture imaging mode can be set by the imaging mode switch 6.

Figure 2:
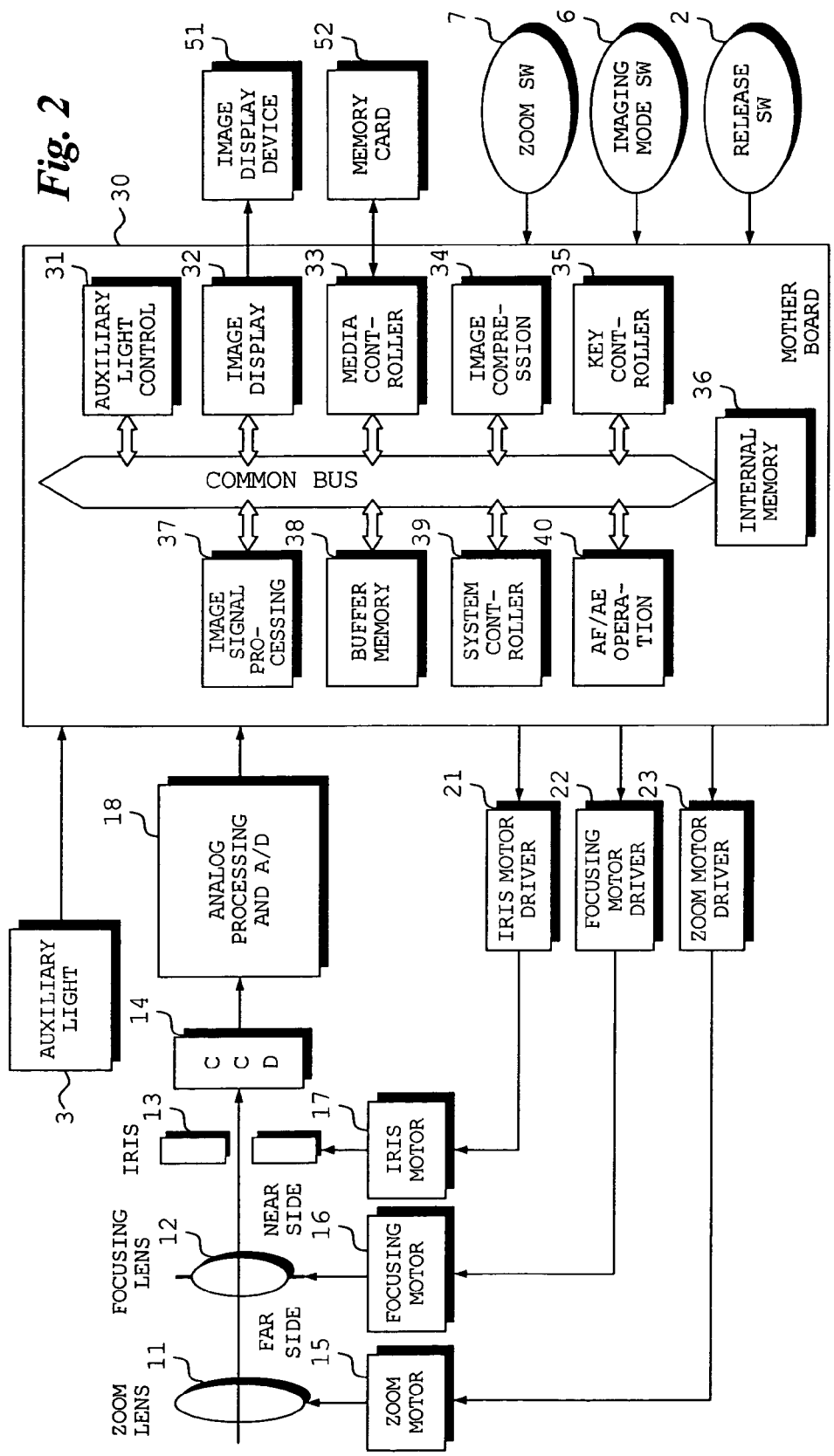
FIG. 2 is a block diagram showing the electrical configuration of the digital still camera.

FIG. 2 is a block diagram showing the electrical configuration of the digital still camera 1.

The digital still camera 1 comprises a mother board 30. A system controller 39 for supervising the overall operation of the digital still camera 1 is provided on the mother board 30. Further, an internal memory 36 storing a program, predetermined data, and so on is also provided on the mother board 30. The system controller 39, the internal memory 36, and so on are connected by a common bus.

Signals respectively outputted from the zoom switch 7, the imaging mode switch 6, and the shutter release switch 2 are inputted to a key controller 35 provided on the mother board 30.

As described above, the digital still camera 1 is provided with the auxiliary light emitting device 3. The light emission of the auxiliary light emitting device 3 is controlled by an auxiliary light control circuit 31.

The digital still camera 1 is provided with a zoom lens 11 for performing optical zooming and a focusing lens 12 for forming a subject image on a light receiving surface of a CCD 14. An iris 13 for controlling the amount of light incident on the CCD 14 is also provided ahead of the CCD 14. Both respective optical axes of the zoom lens 11 and the focusing lens 12 coincide with an optical axis of the CCD 14, and are movable along the optical axis. The side in a direction nearer to the CCD 13 is the NEAR side, and the side in a direction away from the CCD 14 is the FAR side. The zoom lens 11, the focusing lens 12, and the iris 13 are respectively controlled by a zoom motor 15, a focusing motor 16, and an iris motor 17. The zoom motor 15, the focusing motor 16, and the iris motor 17 are respectively controlled by a zoom motor driver 23, a focusing motor driver 22, and an iris motor driver 21.

A subject is imaged in a predetermined period (1/30 seconds that is two times that is a normal imaging period, i.e., 1/15 seconds) by the CCD 14, so that a video signal representing a subject image is outputted in the predetermined period. Of course, the imaging period is not limited to 1/30 seconds. For example, it may be another period such as 1/60 seconds. The video signal is inputted to an analog processing and A/D (analog-to-digital) circuit 18. In the analog processing and A/D circuit 18, the video signal is subjected to predetermined analog processing such as correlated double sampling, and is converted into digital image data.

The digital image data obtained by the conversion is applied to an AF (Auto Focus)/AE (Automatic Exposure) operation circuit 40. In the AF/AE operation circuit 40, a high-frequency component is extracted from the digital image data, so that focusing data representing the degree of focusing of the subject image is operated. The focusing motor 16 is controlled by the focusing motor driver 22 on the basis of the operated focusing data, so that the focusing lens 12 is moved. The position of the focusing lens 12 at which the level of the focusing data increases to a maximum upon repetition of the imaging of the subject and the operation of the focusing data is determined as a focusing position (CCDAF). In the AF/AE operation circuit 40, luminance data is produced from the image data. The iris motor driver 21 is controlled on the basis of the produced luminance data. The iris motor 17 is controlled by the iris motor driver 21, so that an f-stop value of the iris 13 is controlled. The brightness of the subject and the change in the brightness are found by the produced luminance data.

The image data outputted from the analog processing and A/D circuit 18 is applied to a buffer memory 38 through the common bus on the mother board 30, and is temporarily stored therein.

The image data is read from the buffer memory 38, and is inputted to an image signal processing circuit 37. In the image signal processing circuit 37, predetermined image signal processing such as gamma correction and white balance adjustment is performed. The image data outputted from the image signal processing circuit 37 is applied to an image display control circuit 32. A subject image represented by the image data is displayed on a display screen of an image display device 51.

In a case where the still picture imaging mode is set, when the release switch 2 is pressed in a first stage, the positioning of the focusing lens 12 and the opening control of the iris 13 are carried out, as described above. When the release switch 2 is pressed in a second stage, the image data outputted from the image signal processing circuit 37 is recorded on a memory card 52 by a media controller 33, as described above.

Figure 3:
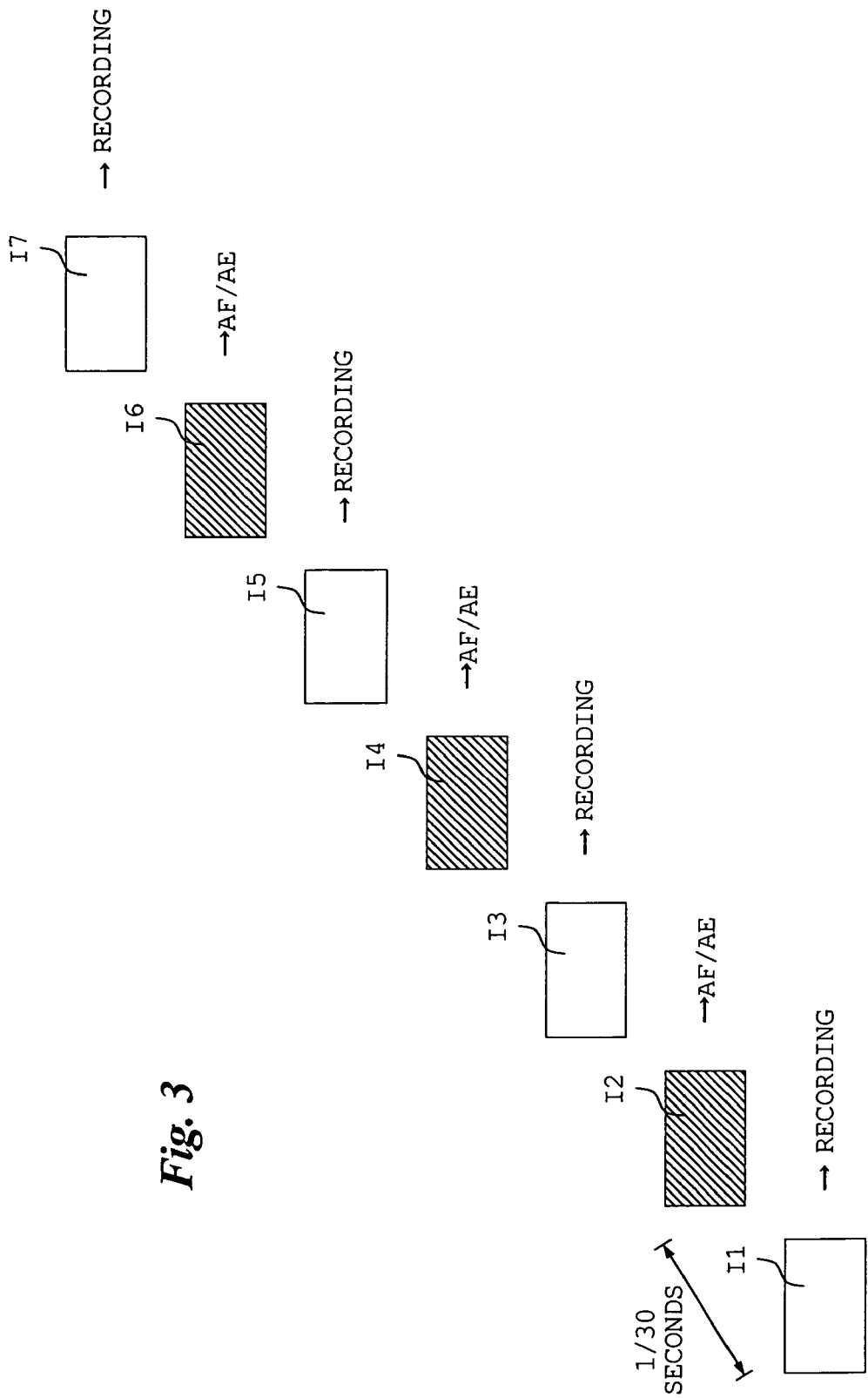
FIG. 3 illustrates a subject image obtained by imaging in a predetermined period.

FIG. 3 illustrates subject images respectively corresponding to a large number of frames obtained by imaging a subject in a predetermined period.

Although a normal imaging period is 1/15 seconds, 1/30 seconds that is two times the normal imaging period is taken as an imaging period in the digital still camera according to the present embodiment. In a case where the moving picture imaging mode is set, when the release switch 2 is pressed in the first stage, the above-mentioned AF/AE operation is executed using image data representing subject images I2, I4, I6, etc. (indicated by hatching) respectively corresponding to even-numbered frames out of image data obtained by imaging the subject in the predetermined period. Particularly in the present embodiment, auxiliary light is emitted to the subject from the auxiliary light emitting device 3 in synchronization with timing where the subject images I2, I4, I6, etc. respectively corresponding to even-numbered frames are obtained by the imaging. Since AF/AE control is carried out using the subject images I2, I4, I6, etc. obtained when the auxiliary light is emitted, a subject image having relatively proper brightness is obtained even when the subject is dark. Since AF/AE control is carried out utilizing image data representing the subject image having the relatively proper brightness, relatively accurate AF/AE control can be achieved. Image data representing subject images I1, I3, I5, I7, etc. respectively corresponding to odd-numbered frames are recorded on the memory card 52 as image data representing a moving picture. When the release switch 2 is pressed again, the recording of the image data on the memory card 52 is stopped.

The image data representing the subject images I2, I4, I6, etc. respectively corresponding to even-numbered frames are not recorded on the memory card 52. The image data representing the subject images I2, I4, I6, etc. respectively corresponding to even-numbered frames that are affected by auxiliary light are not recorded. In a case where the image data recorded as a moving picture on the lo memory card 52 is reproduced, therefore, the moving picture can be avoided being difficult to see by the auxiliary light.

Although in the above-mentioned example, the image data representing the subject images respectively corresponding to even-numbered frames are used for AF/AE, and the image data representing the subject images respectively corresponding to odd-numbered frames are used for recording, the image data representing the subject images respectively corresponding to odd-numbered frames may be used for AF/AE, and the image data representing the subject images respectively corresponding to even-numbered frames may be used for recording. Further, the subject images for AF/AE and the subject images for recording may not be necessarily alternated. The subject images may be utilized for AF/AE at a rate of one frame per a plurality of frames.

Figure 4:
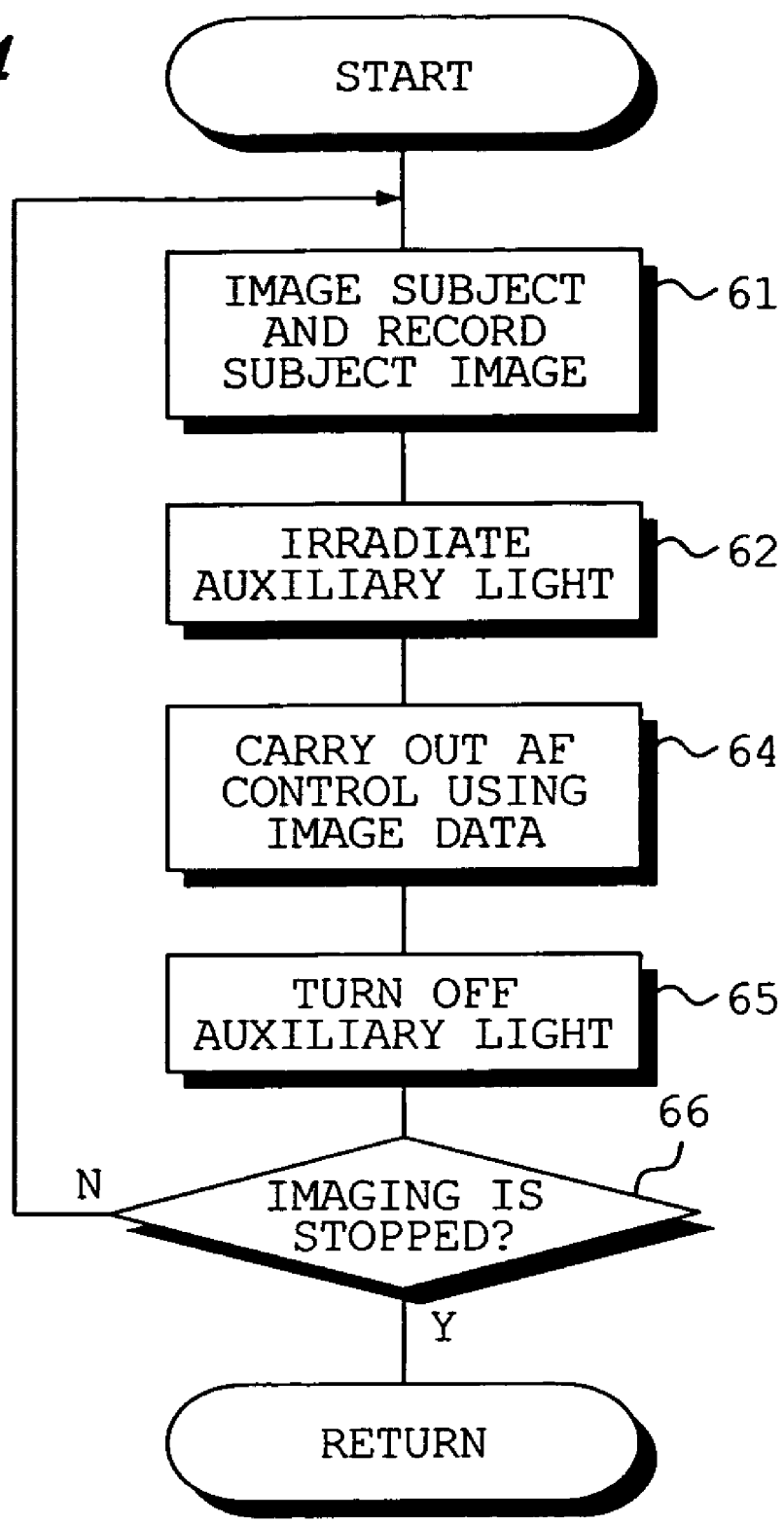
FIG. 4 is a flow chart showing the procedure for processing in a moving picture imaging mode.

FIG. 4 is a flow chart showing the procedure for processing in a moving picture recording mode.

When the moving picture recording mode is set, and the release switch 2 is pressed, a subject is imaged, and image data representing a subject image corresponding to the first frame obtained by the imaging is obtained. The obtained image data is recorded on the memory card 52 (step 61). When the subject image represented by the image data recorded on the memory card 52 is obtained by the imaging, as described above, no auxiliary light is emitted.

Then, auxiliary light is irradiated onto the subject at timing where a subject image corresponding to the second frame is obtained after an elapse of 1/30 seconds (step 62). The focusing lens 12 is moved, so that the subject is imaged. AF control (also AE control) is carried out, as described above, using image data representing a subject image obtained by the imaging (step 64). When the subject is imaged, the auxiliary light is turned off (step 65).

The processing in the foregoing steps 61 to 65 is repeated until the release switch 2 is pressed again to stop the imaging (step 66).

Figure 5:
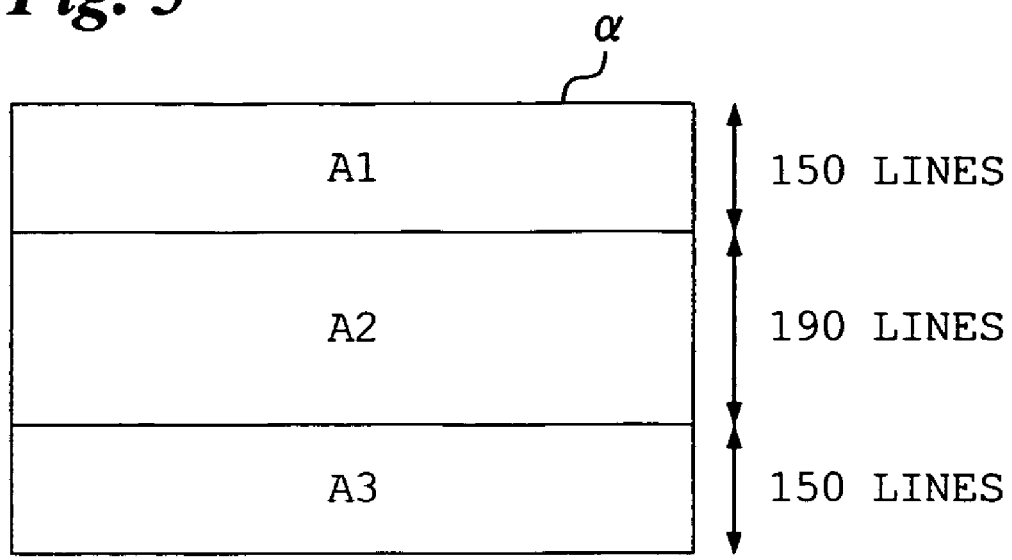
FIG. 5 illustrates an example of a subject image.
Figure 6:
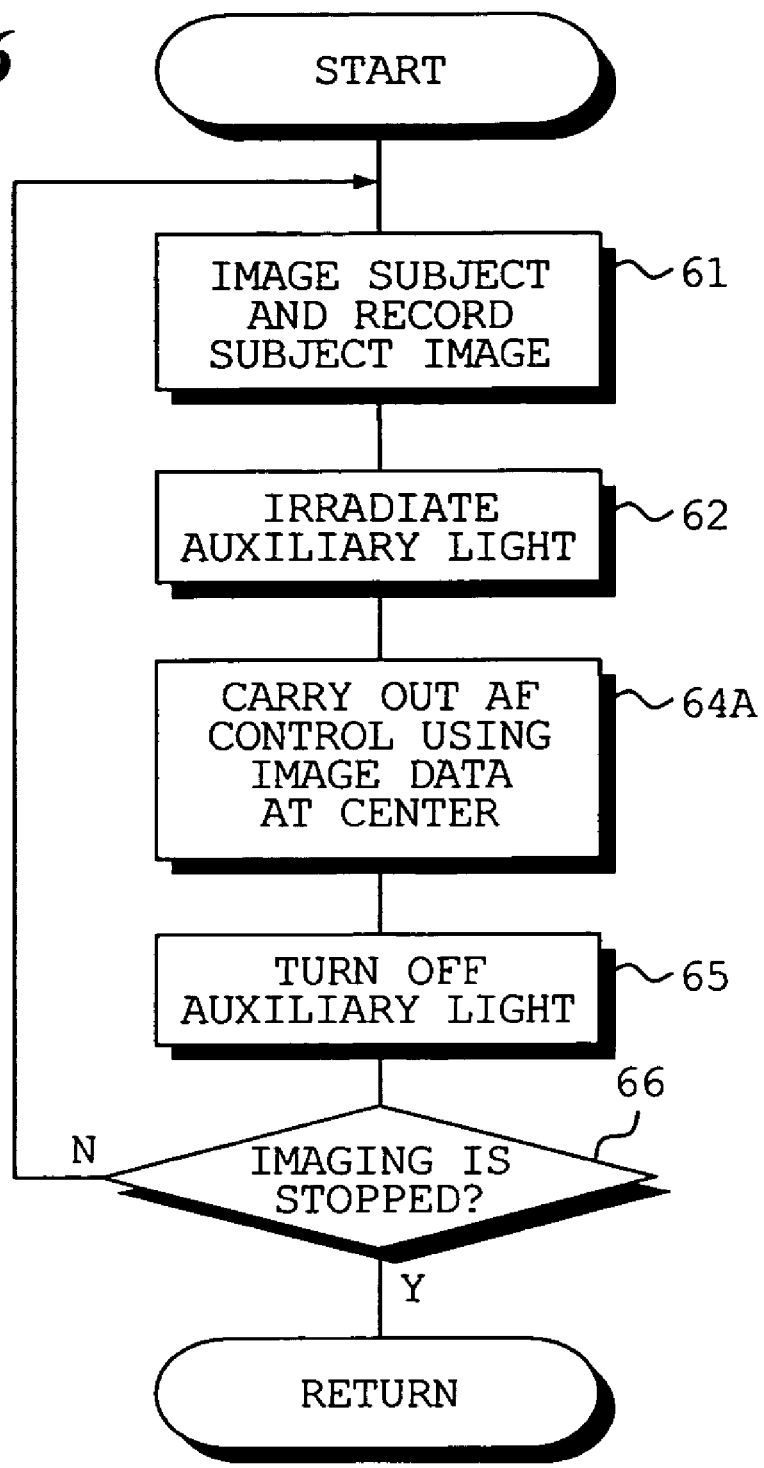
FIG. 6 is a flow chart showing the procedure for processing in a moving picture imaging mode.

FIGS. 5 and 6 illustrate a modified example.

FIG. 5 illustrates an example of a subject image obtained by imaging.

A subject image a is divided into three areas A1, A2, and A3 in the longitudinal direction. The first area A1, the second area A2, and the third area A3 respectively correspond to 150 lines, 190 lines, and 150 lines.

In the modified example, the above-mentioned AF control is carried out using image data representing an image in the second area A2. Since the AF control is carried out using the image data in the second area A2 that is a part of the subject image a corresponding to one frame, the AF control can be quickly carried out.

The area division is not limited to division into three parts or division in the longitudinal direction. For example, image data that is a part of image data representing a subject image corresponding to one frame may be obtained.

FIG. 6 is a flow chart showing the procedure for processing in a moving picture recording mode. In FIG. 6, the same processing as the processing shown in FIG. 4 is assigned the same reference numeral.

As described above, a subject is imaged, and image data representing a subject image is recorded on the memory card 52 (step 61). Auxiliary light is irradiated (step 62), so that a subject image representing a subject onto which the auxiliary light has been irradiated is obtained. AF control is carried out using image data in an area that is a part at the center of the subject image (step 64A). Thereafter, the auxiliary light is turned off (step 65). The processing in the steps 61 to 65 is continued until the imaging is stopped.

FIGS. 7 to 10 illustrate another embodiment.

In the present embodiment, fine adjustment AF control in which a moving step (a movement amount) of the focusing lens 12 for focusing control is relatively fine and coarse adjustment AF control in which the moving step of the focusing lens 12 is relatively coarse are carried out.

Figure 7:
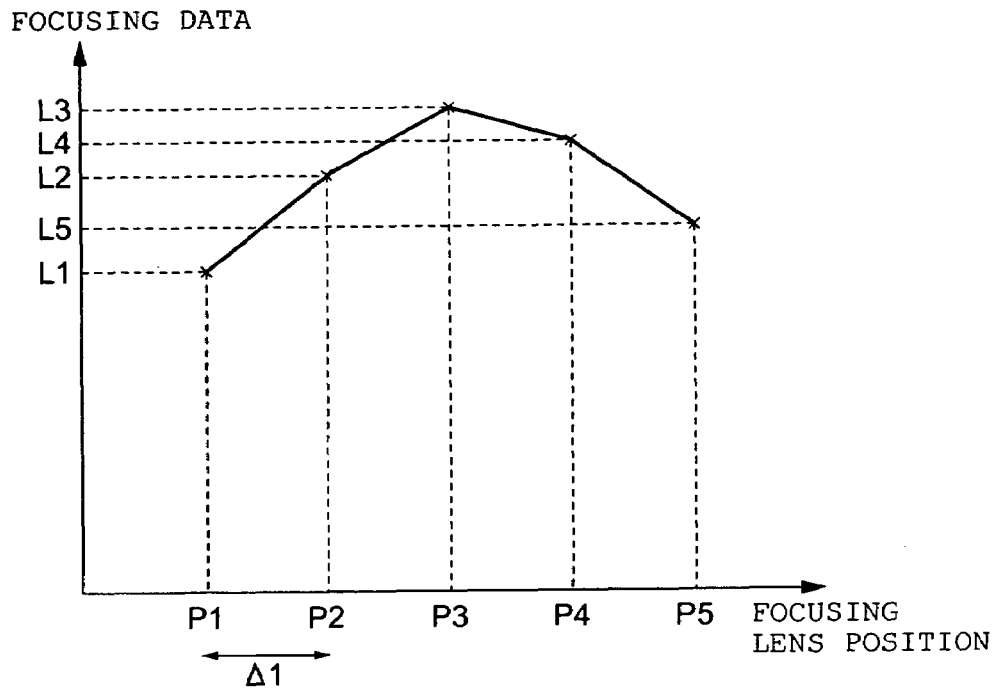
FIG. 7 illustrates the relationship between a focusing lens position and focusing data in coarse adjustment AF control.

FIG. 7 illustrates the relationship between the position of the focusing lens 12 at the time of the coarse adjustment AF control and focusing data obtained at the position.

The focusing lens 12 is positioned, respectively, at lens positions such as lens positions P1, P2, P3, P4, and P5 at intervals of a moving step $\Delta 1$, and a subject is imaged at each of the positions each time, to obtain focusing data. The focusing data obtained at the lens positions P1, P2, P3, P4, and P5 are respectively L1, L2, L3, L4, and L5. When the focusing data L3 is the maximum, the position P3 of the focusing lens 12 at which the focusing data L3 is given is determined as a focusing position. The moving step $\Delta 1$ is relatively large, so that the focusing control is referred to as coarse adjustment AF control.

Figure 8:
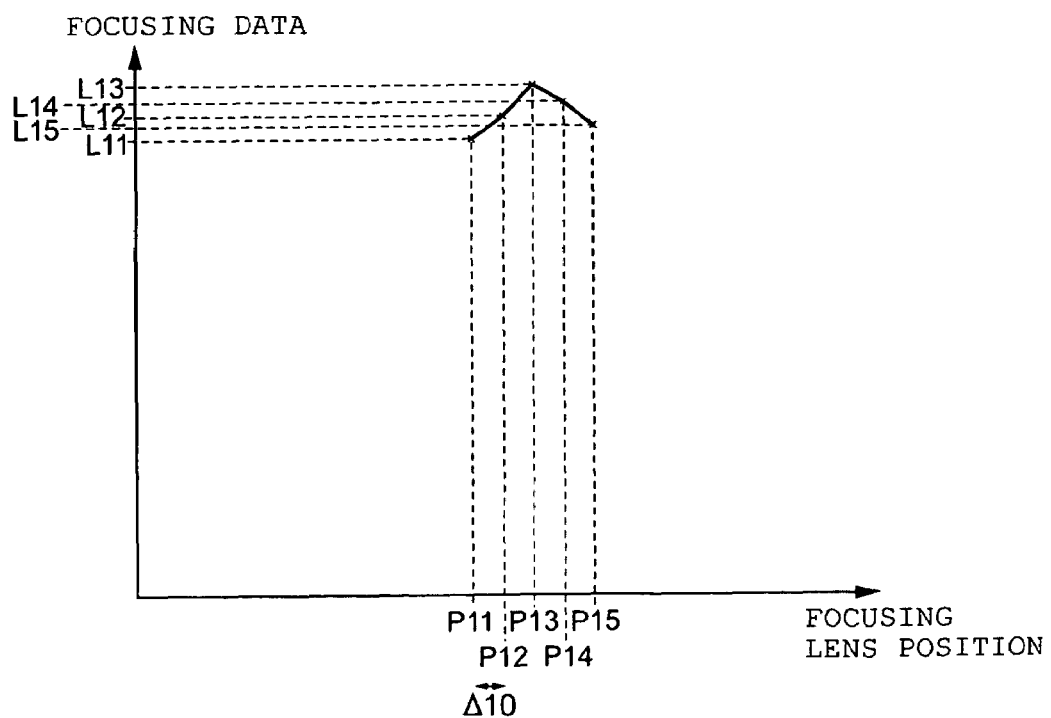
FIG. 8 illustrates the relationship between a focusing lens position and focusing data in fine adjustment AF control.

FIG. 8 illustrates the relationship between the position of the focusing lens 12 at the time of fine adjustment AF control and focusing data obtained at the position.

At the time of the fine adjustment AF control, the focusing lens 12 is positioned, respectively, at lens positions such as lens positions P11, P12, P13, P14, and P15 at intervals of a moving step $\Delta 10$ ($\Delta 1 > \Delta 10$), so that focusing data L11, L12, L13, L14, and L15 at the respective positions are obtained. When the focusing data L13 is the maximum, the position P13 of the focusing lens 12 at which the focusing data L13 is given is determined as a focusing position. The moving step $\Delta 10$ is relatively small, so that the focusing control is referred to as fine adjustment AF control.

The fine adjustment AF control allows the focusing precision to be improved. When the subject is extremely moved, however, it may, in some cases, take time until the subject is brought into focus. On the other hand, in the coarse adjustment AF control, the focusing precision is not very high. Even when the subject is extremely moved, however, time required until the subject is brought into focus is relatively early. In the present embodiment, the fine adjustment AF control is generally carried out. In cases where it is considered that the distance to the subject is changed by not less than a predetermined value, such as a case where the brightness of the subject is rapidly changed, the coarse adjustment AF control is carried out. The change in the brightness can be calculated from luminance data produced from the image data, as described above.

Figure 9:
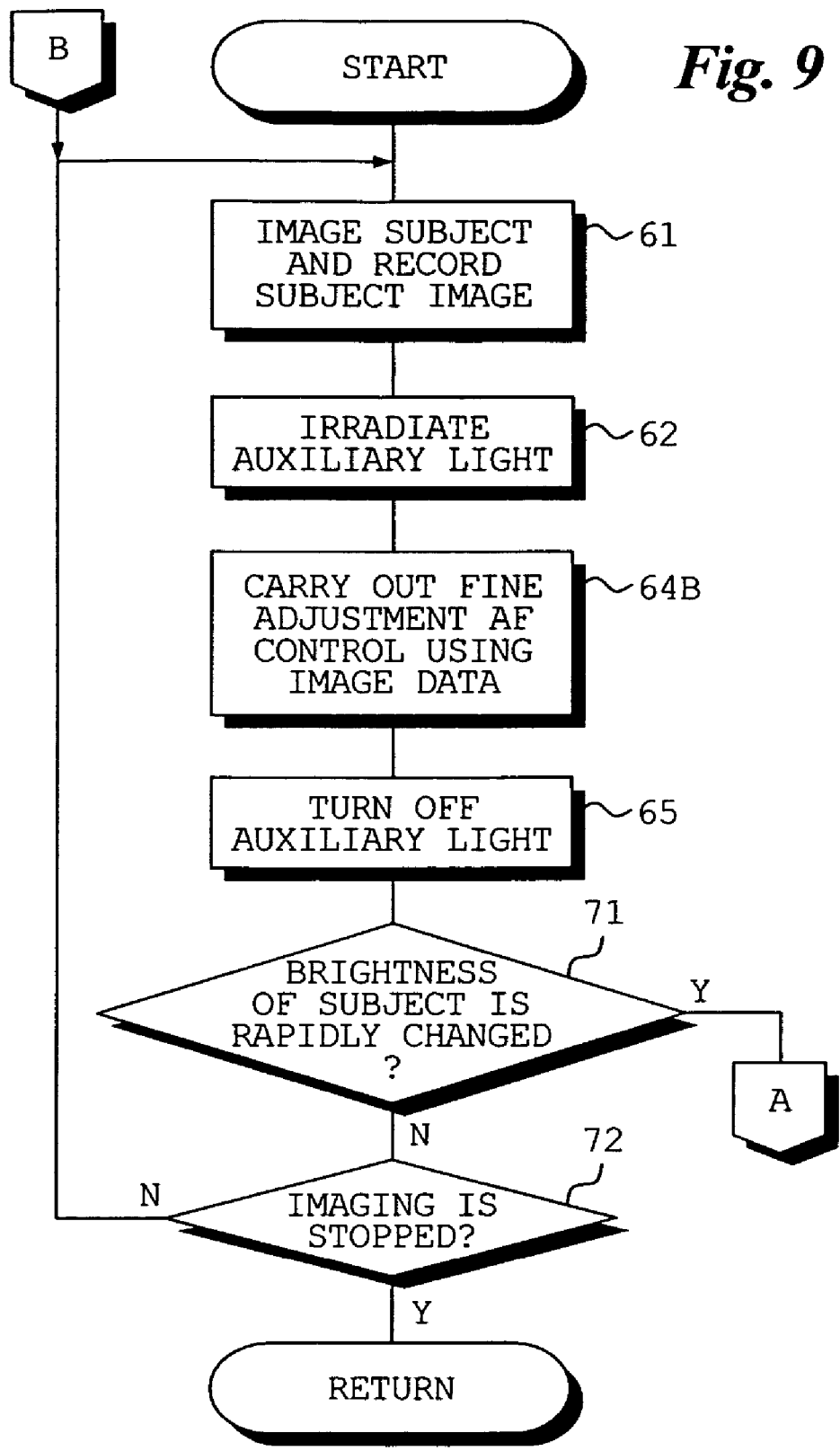
Figure 10:
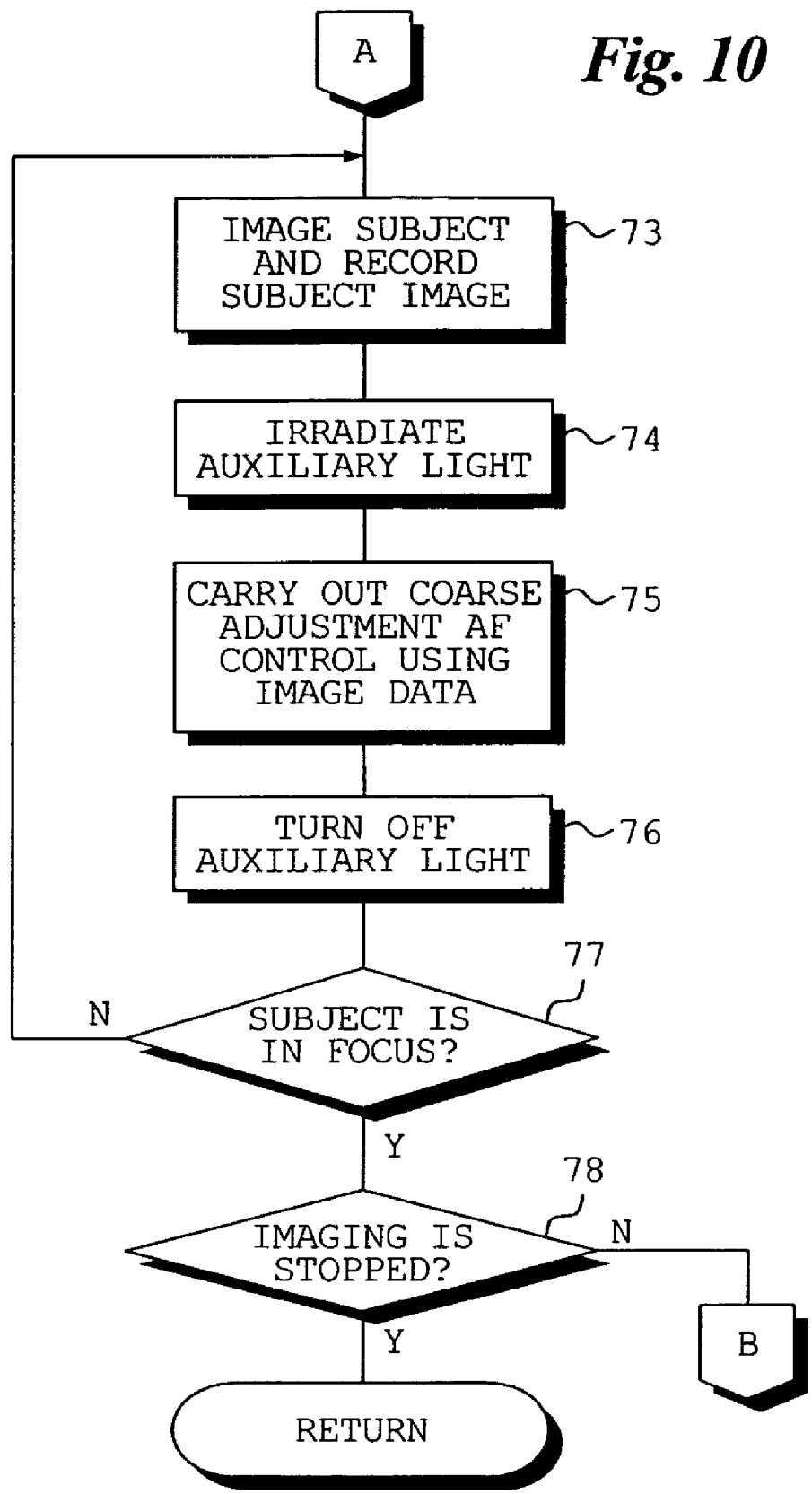

FIGS. 9 and 10 are flow charts showing the procedure for processing in a moving picture recording mode. In the figures, the same processing as the processing shown in FIG. 4 is assigned the same reference numeral.

A subject is imaged, and image data representing a subject image is recorded on the memory card 52 (step 61). Auxiliary light is irradiated (step 62), and fine adjustment AF control is carried out using image data obtained by imaging the subject onto which auxiliary light has been irradiated (step 64B). Thereafter, the auxiliary light is turned off.

It is determined whether or not the brightness of the subject is changed by not less than a predetermined level from that a predetermined time period before (e.g., one frame before) (step 71). When the distance to the subject is changed, as described above, the brightness of the subject is changed by not less than a predetermined level depending on the change. Unless the brightness of the subject is changed (NO in step 71), it is considered that the distance to the subject is not greatly changed. So long as there is no imaging stop command (NO in step 72), the processing in the steps 61 to 71 is repeated. Consequently, the fine adjustment AF control is repeated. When the brightness of the subject is changed (YES in step 71), it is considered that the distance to the subject is changed, so that coarse adjustment AF control, described later, is carried out.

A subject is imaged, and image data representing a subject image is recorded on the memory card 52 (step 77). Auxiliary light is irradiated (step 74), and coarse adjustment AF control is carried out using the image data obtained by imaging the subject onto which the auxiliary light has been irradiated (step 75). The auxiliary light is turned off (step 76). The imaging of the subject and the recording of the image data obtained by the imaging are alternated with the coarse adjustment AF control for each frame until the subject is brought into focus (steps 77 to 76). When the subject is brought into focus in the coarse adjustment AF control (YES in step 77), the procedure is returned to the processing in the step 61 for the fine adjustment AF control if there is no imaging stop command (NO in step 78).

Figure 11:
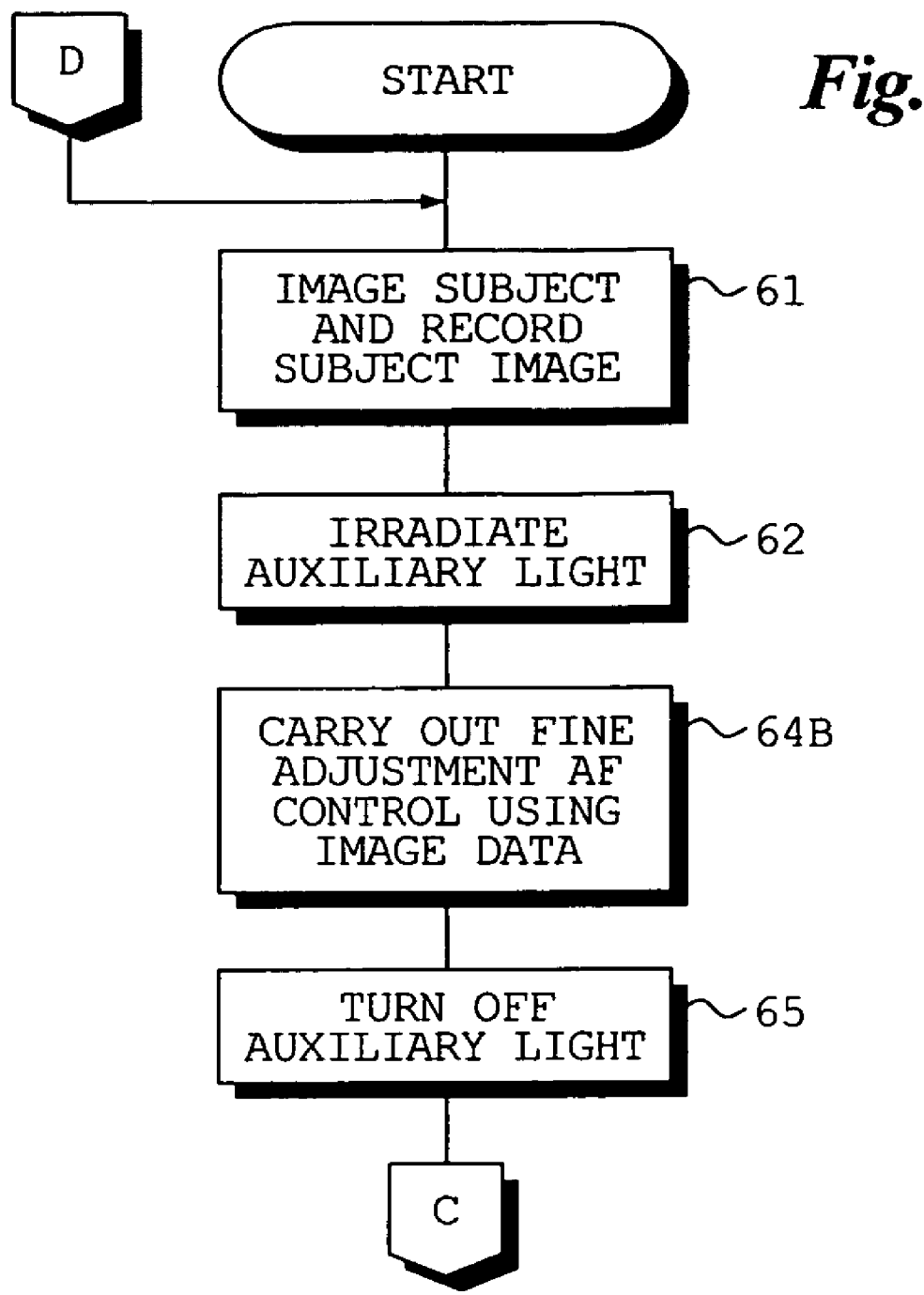
Figure 12:
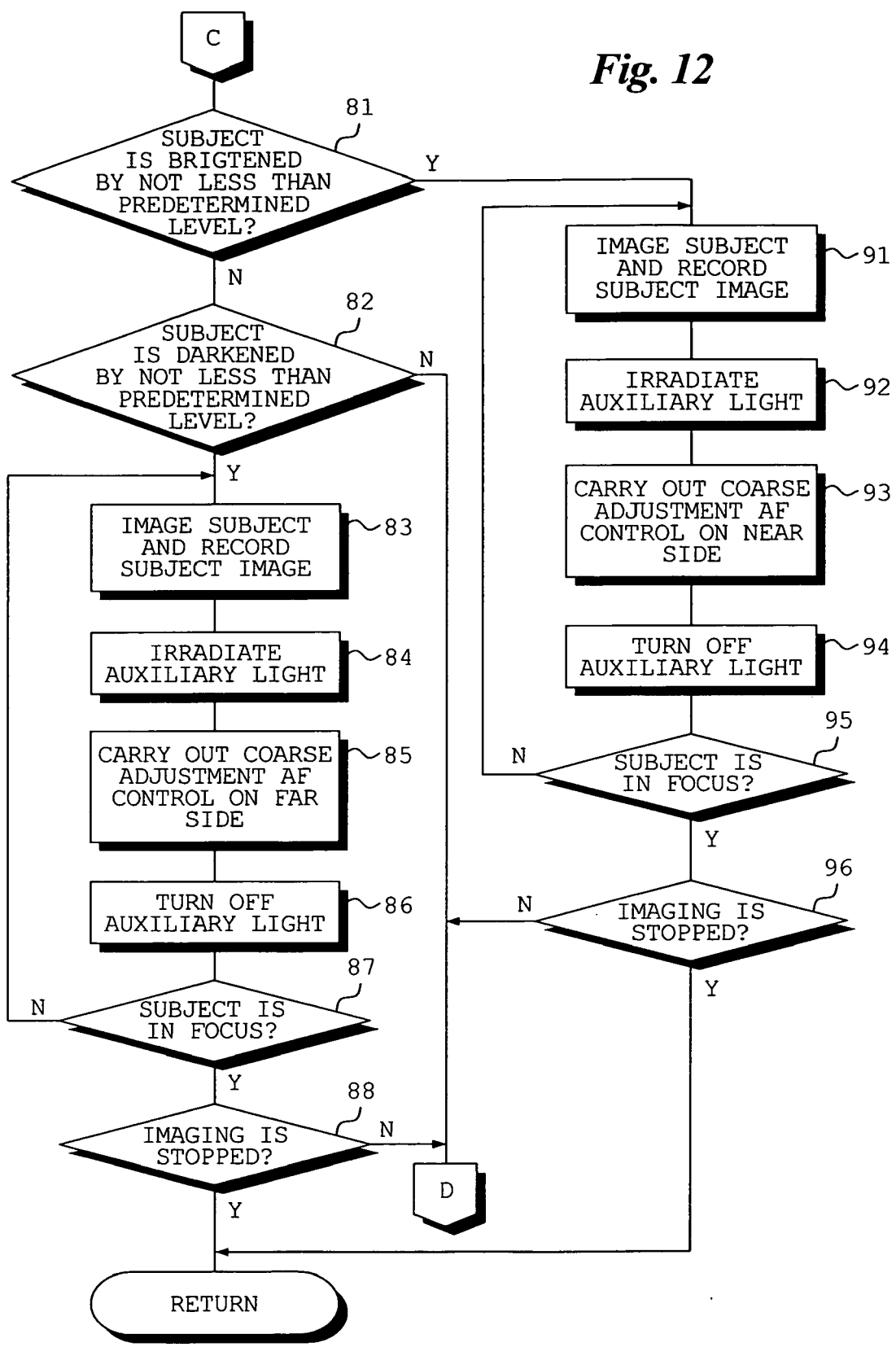

FIGS. 11 and 12 are flow charts showing the procedure for processing in the moving picture imaging mode, showing still another embodiment. In the figures, the same processing as the processing shown in FIG. 4 is also assigned the same reference numeral.

In the present embodiment, when the brightness of a subject is changed in a direction in which the subject is brightened, the focusing lens 12 is moved toward the NEAR side, so that coarse adjustment AF control is carried out. When the brightness of a subject is changed in a direction in which the subject is darkened, the focusing lens 12 is moved toward the FAR side, so that coarse adjustment AF control is carried out. When the subject is brightened, it is considered that the subject comes closer to a camera, so that the vicinity on the NEAR side of the focusing lens 12 becomes a focusing position in many cases. Conversely when the subject is darkened, it is considered that the subject moves farther apart from the camera, so that the vicinity on the FAR side of the focusing lens 12 becomes a focusing position in many cases. Since the initial position of the focusing lens 12 is determined depending on the distance to the subject, the subject can be brought into focus relatively early.

A subject is imaged, and image data representing a subject image is recorded on the memory card 52 (step 61). Auxiliary light is irradiated (step 62), and fine adjustment AF control is carried out using the image data representing the subject image (step 64B). Thereafter, the auxiliary light is turned off (step 65).

It is confirmed whether the subject is brightened (step 81) or darkened (step 82) by not less than a predetermined level. If the subject is neither brightened nor darkened by not less than the predetermined level (No in step 81, No in step 82), it is considered that the distance to the subject is not appreciably changed, so that the fine adjustment AF control performed in the processing in the steps 61 to 65 is continued.

When the subject is brightened by not less than the predetermined level (YES in step 81), the subject is imaged, and image data representing a subject image is recorded on the memory card 52 (step 91). Auxiliary light is irradiated (step 92), and the focusing lens 12 is positioned on the NEAR side so that the subject is imaged. Coarse adjustment AF control is carried out on the basis of the image data obtained by the imaging (step 93). Thereafter, the auxiliary light is turned off (step 94). The processing in the steps 91 to 94 is repeated until the subject is brought into focus (No in step 95). When the subject is brought into focus (YES in step 95), the procedure is returned to the processing in the step 61 if there is no imaging stop command (No in step 96).

When the subject is darkened by not less than the predetermined level (No in step 81, Yes in step 82), the subject is imaged, and image data representing a subject image is recorded on the memory card 52 (step 83). Auxiliary light is irradiated (step 84), and the focusing lens 12 is positioned on the FAR side so that the subject is imaged. Coarse adjustment AF control is carried out on the basis of the image data obtained by the imaging (step 85). Thereafter, the auxiliary light is turned off (step 86). The processing in the steps 83 to 86 is repeated until the subject is brought into focus (No in step 87). When the subject is brought into focus (YES in step 87), the procedure is returned to the processing in the step 61 if there is no imaging stop command (No in step 88).

Figure 13:
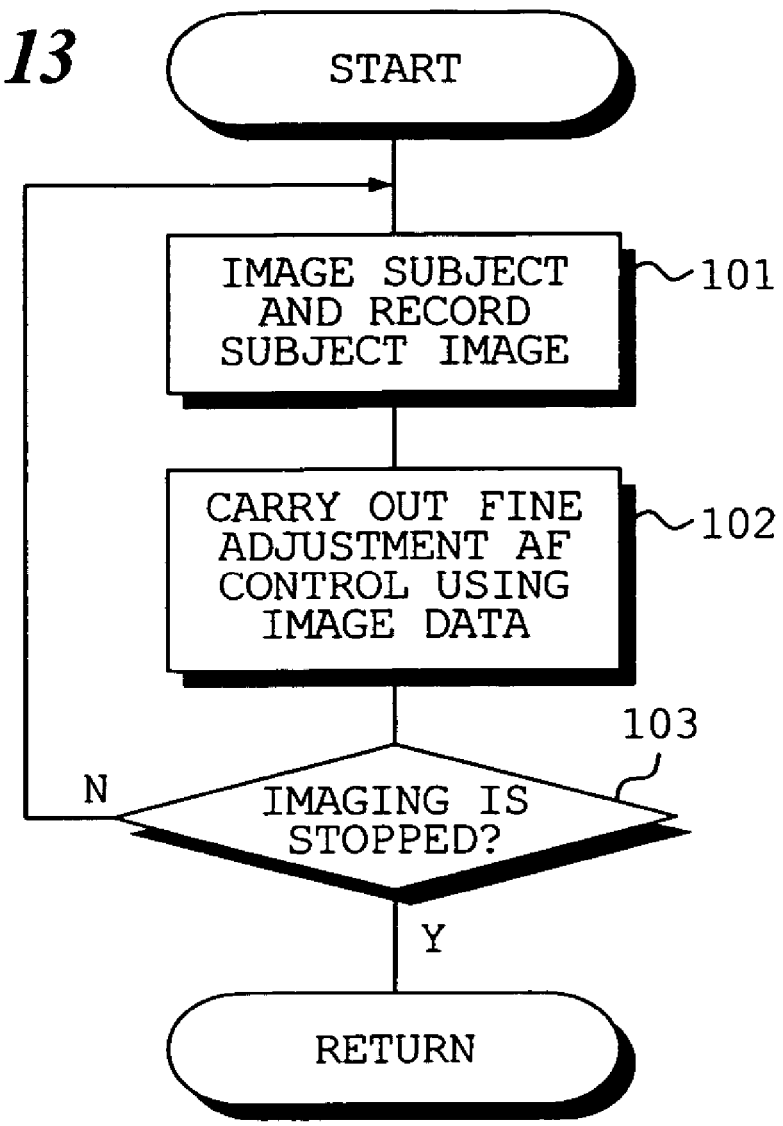

FIG. 13 is a flow chart showing the procedure for processing in a moving picture imaging mode, showing still another embodiment.

The present embodiment is the same as the above-mentioned embodiments in that image data representing subject images respectively corresponding to even-numbered frames are recorded on the memory card 52. At timing where subject images respectively corresponding to odd-numbered frames are obtained, however, not irradiation of auxiliary light but fine adjustment AF control is carried out. Image data obtained at the time of the fine adjustment AF control is not recorded on the memory card 52. Even if the image data is affected by the movement of the focusing lens 12, the image data that has been affected is not recorded on the memory card 52, so that a reproduced image is not affected by blurring or the like due to the movement of the focusing lens 52.

A subject is imaged, and image data representing a subject image is obtained. The obtained image data is recorded on the memory card 52 (step 101). The focusing lens 12 is moved by a very small distance, and focusing data is obtained from the image data obtained by imaging the subject at a position to which the focusing lens 12 has been moved (fine adjustment AF control) (step 102). Until an imaging stop command is given (No in step 103), the imaging of the subject and the recording of the image data representing the subject image on the memory card are alternated with the movement of the focusing lens 12 and the calculation of the focusing data from the image data obtained at the position to which the focusing lens 12 has been moved for each frame.

Figure 14:
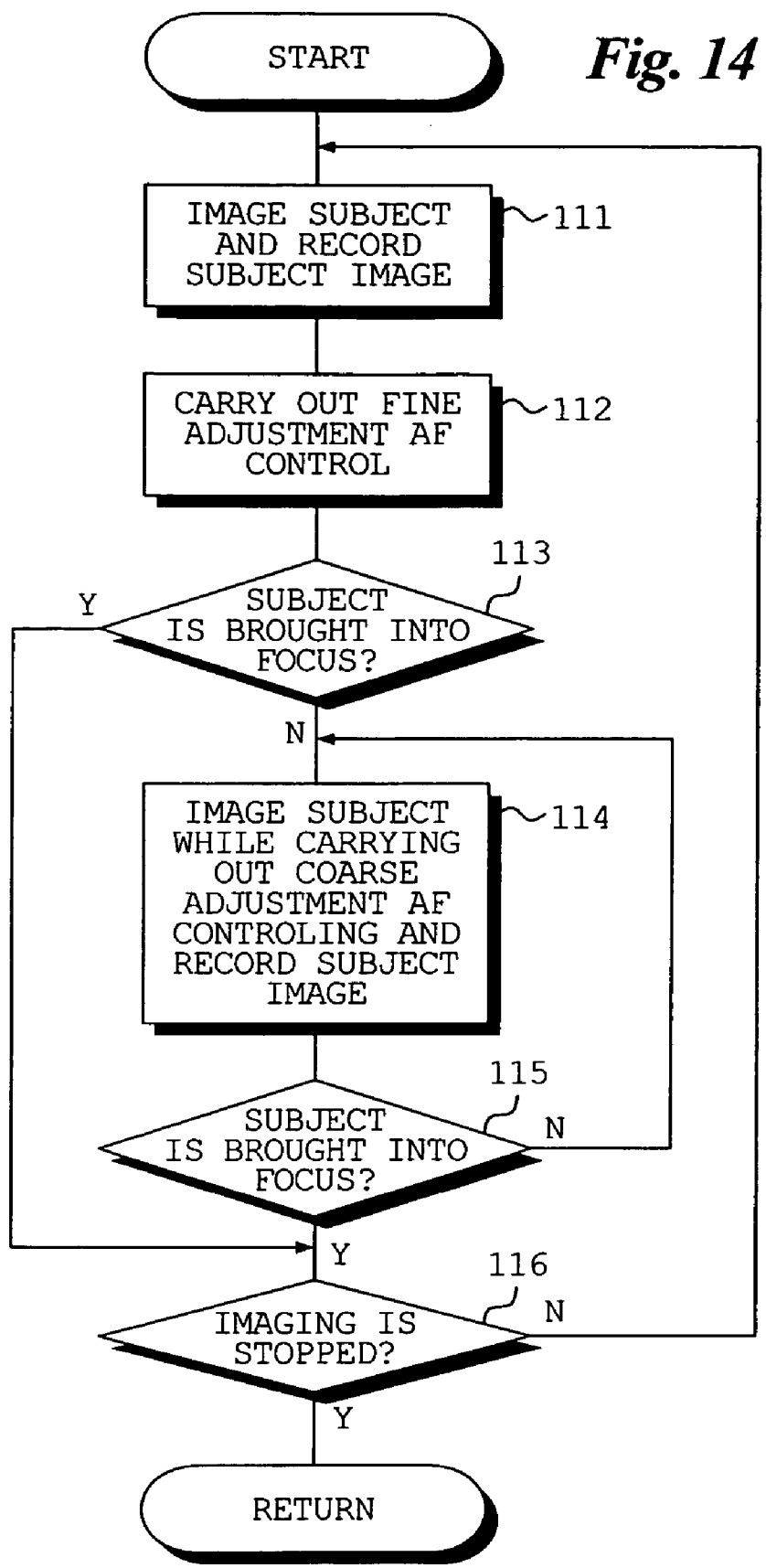

FIG. 14 is a flow chart showing the procedure for processing in the moving picture imaging mode, showing a further embodiment.

In the present embodiment, when a subject is not brought into focus in fine adjustment AF control, coarse adjustment AF control is carried out at timing where subject images respectively corresponding to odd-numbered frames that are recorded on the memory card 52 are obtained by the imaging, while fine adjustment AF control is carried out at timing where subject images respectively corresponding to even-numbered frames that are not recorded on the memory card 52 are obtained by the imaging. Image data obtained when the fine adjustment AF control is carried out is not recorded on the memory card 52, so that a reproduced image can be avoided being affected by the fine adjustment AF control.

A subject is imaged, and image data representing a subject image is recorded on the memory card 52 (step 111). The focusing lens 12 is moved in order to carry out fine adjustment AF control after a predetermined period, so that the subject is imaged again. Focusing data is calculated from the obtained image data so that the fine adjustment AF control is carried out (step 112).

If the subject is brought into focus (YES in step 113), the processing in the steps 111 to 113 is repeated unless an imaging stop command is given (No in step 116).

If the subject is not brought into focus (NO in step 113), the focusing lens 12 is moved in a moving step corresponding to coarse adjustment AF control so that the subject is imaged. Focusing data is calculated from the image data obtained by the imaging. The image data obtained by the imaging is also recorded on the memory card 52 (step 114). Until the subject is brought into focus (NO in step 115), the coarse adjustment AF control is carried out. When the subject is brought into focus (YES in step 115), the procedure is returned to the step 111 if there is no imaging stop command (NO in step 116).

Figure 15:
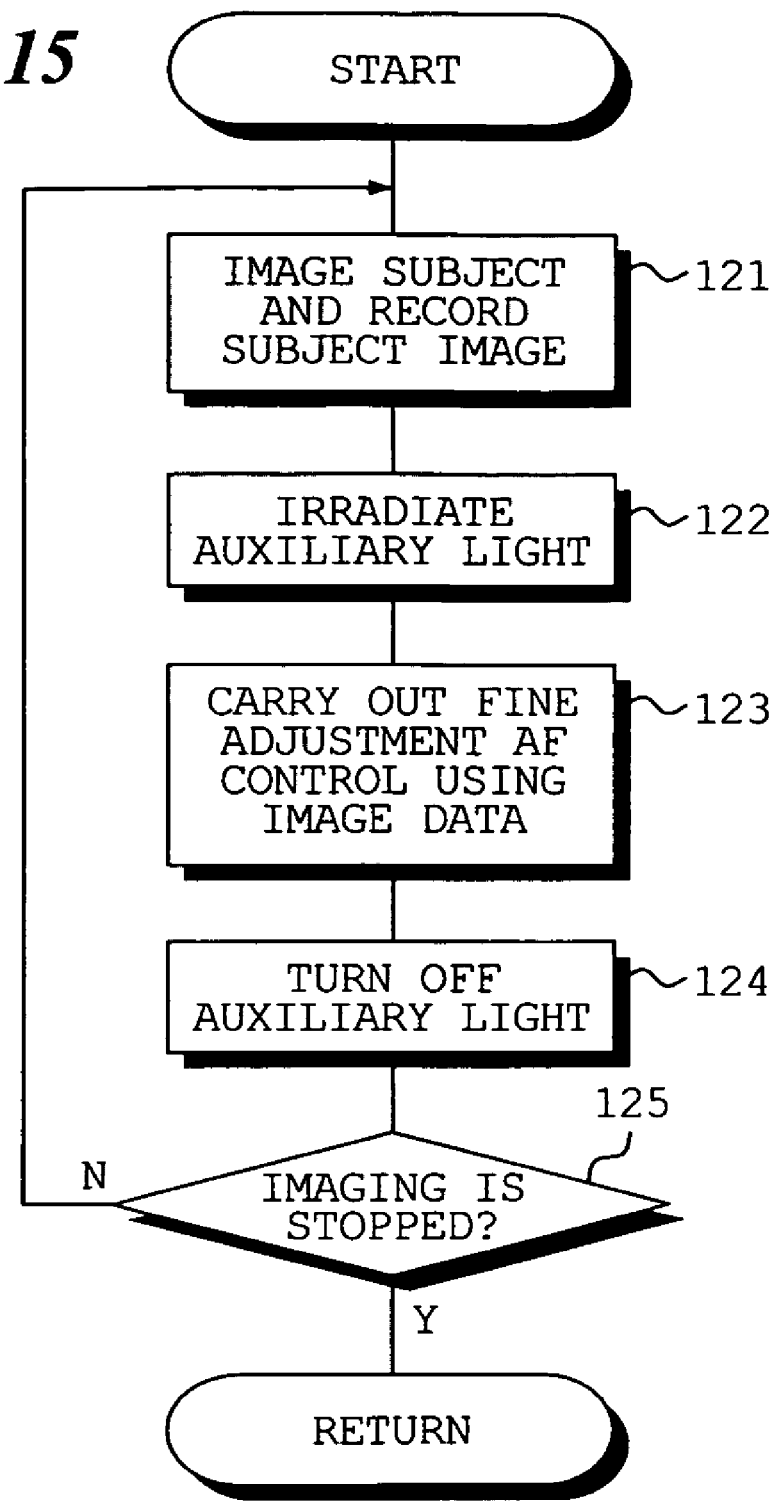

FIG. 15 is a flow chart showing the procedure for processing in a moving picture recording mode, showing a still further embodiment.

Image data representing subject images respectively corresponding to odd-numbered frames are recorded on the memory card 52 (step 121). Auxiliary light is irradiated at timing where subject images respectively corresponding to even-numbered frames are obtained by imaging (step 122), and fine adjustment AF control is carried out (step 123). Thereafter, the auxiliary light is turned off (step 124). The processing in the steps 121 to 124 is continued until an imaging stop command is given (step 125).

FIG. 16 is a flow chart showing the procedure for processing in the moving picture imaging mode, showing a still further embodiment.

In the present embodiment, when the brightness of a subject is changed by not less than a predetermined level, the amount of a moving step of the focusing lens 12 in coarse adjustment AF control is changed depending on the amount of change in the brightness. The larger the amount of change in the brightness is, the larger the amount of the moving step becomes. The smaller the amount of change in the brightness is, the smaller the amount of the moving step becomes. Although it is considered that the larger the amount of change in the brightness is, the larger the change in the distance to the subject becomes, the amount of the moving step is also increased, so that a time period required until the subject is brought into focus can be shortened.

A subject is imaged, and image data representing a subject image is recorded on the memory card 52 (step 131). Auxiliary light is irradiated at timing where a subject image corresponding to the subsequent frame is obtained (step 132), and fine adjustment AF control is carried out (step 133). Thereafter, the auxiliary light is turned off (step 134).

Unless the brightness of the subject is changed by not less than a predetermined level (No in step 135), the processing in the steps 131 to 134 is repeated.

If the brightness of the subject is changed by not less than the predetermined level (YES in step 135), the amount of a step for coarse adjustment AF control is changed depending on the amount of change in the brightness (step 136). As described above, the larger the amount of change in the brightness is, the larger the step amount becomes. The smaller the amount of change in the brightness is, the smaller the step amount becomes.

A subject is imaged for the subsequent frame, and image data representing a subject image is recorded on the memory card 52 (step 137). Further, auxiliary light is irradiated again at timing where the subject image corresponding to the subsequent frame is obtained (step 138), and coarse adjustment AF control is carried out (step 139). In the coarse adjustment AF control, it goes without saying that the position of the focusing lens 12 is moved by the step amount corresponding to the amount of change in the brightness, as described above. Thereafter, the auxiliary light is turned off (step 140). The processing in the steps 137 to 140 is repeated until the subject is brought into focus (step 141). When the subject is brought into focus (YES in step 141), the procedure is returned to the processing in the step 131 again unless an imaging stop command is given (No in step 142).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:
   a solid-state electronic imaging device that continuously images a subject in a predetermined period and outputs image data representing a subject image in the predetermined period;
   an imaging lens arranged so as to be movable ahead of a light receiving surface of said solid-state electronic imaging device;
   an auxiliary light emission control device that controls an auxiliary light emitting device such that auxiliary light is periodically irradiated onto the subject at a rate of once per a plurality of times of imaging in said solid-state electronic imaging device;
   an imaging lens positioning device that images the subject onto which the auxiliary light has been periodically irradiated under the control of said auxiliary light emission control device, to position said imaging lens at a focusing position on the basis of the image data outputted from said solid-state electronic imaging device; and
   a recording control device that images the subject when the auxiliary light is not irradiated by said auxiliary light emission control device, to record on a recording medium the image data periodically outputted from said solid-state electronic imaging device.

2. The digital camera according to claim 1, wherein
   said imaging lens positioning device images the subject onto which the auxiliary light has been irradiated under the control of said auxiliary light emission control device, to position said imaging lens at the focusing position on the basis of a part of the image data outputted from said solid-state electronic imaging device.

3. The digital camera according to claim 1, wherein
   the positioning in said imaging lens positioning device is positioning for finely adjusting the position of said imaging lens, further comprising
   a brightness determination device that determines whether or not the brightness of the subject is changed by not less than a predetermined level, and
   an imaging lens positioning control device that switches the positioning in said imaging lens positioning device into positioning by coarse adjustment in response to the determination by said brightness determination device that the brightness of the subject is changed by not less than the predetermined level, and returns the coarse adjustment to the fine adjustment in response to the positioning of the imaging lens at the focusing position by the coarse adjustment.

4. The digital camera according to claim 3, wherein
   said brightness determination device also determines whether the brightness of the subject is so changed as to increase or decrease by not less than the predetermined level, and
   said imaging lens positioning control device switches the positioning in said imaging lens positioning device into positioning for coarsely adjusting the position on the NEAR side in response to the determination by said brightness determination device that the brightness of the subject is so changed as to increase by not less than the predetermined level, switches the positioning in said imaging lens positioning device into positioning for coarsely adjusting the position on the FAR side in response to the determination by said brightness determination device that the brightness of the subject is so changed as to decrease by not less than the predetermined level, and returns the coarse adjustment to the fine adjustment in response to the positioning of the imaging lens at the focusing position by the coarse adjustment.

5. The digital camera according to claim 3, wherein
   said brightness determination device also detects the amount of change in the brightness by not less than the predetermined level, and
   said imaging lens positioning control device decrease the step of adjusting the positioning by said coarse adjustment when the brightness is at not less than the predetermined level and the amount of change in the brightness is small, while increasing the step of adjusting the positioning by said coarse adjustment when the brightness is at not less than the predetermined level and the amount of change in the brightness is large.

6. The digital camera according to claim 1, wherein said recorded image data periodically outputted from said solid-state electronic imaging device represents a movie.

7. In a digital camera comprising a solid-state electronic imaging device that continuously images a subject in a predetermined period and outputs image data representing a subject image in the predetermined period, and an imaging lens arranged so as to be movable ahead of a light receiving surface of said solid-state electronic imaging device, a method of controlling the digital camera, comprising the steps of:

irradiating auxiliary light periodically onto the subject at a rate of once per a plurality of times of imaging in said solid-state electronic imaging device;

imaging the subject onto which the auxiliary light has been periodically irradiated, to position said imaging lens at a focusing position on the basis of the image data outputted from said solid-state electronic imaging device; and imaging the subject when the auxiliary light is not irradiated, to record on a recording medium the image data periodically outputted from said solid-state electronic imaging device.

8. The method of controlling the digital camera according to claim 7, wherein said recorded image data periodically outputted from said solid-state electronic imaging device represents a movie.

* * * * *